United States Patent
Shioiri et al.

(10) Patent No.: US 10,951,082 B2
(45) Date of Patent: Mar. 16, 2021

(54) STATOR OF ROTATING ARMATURE AND ASSEMBLY METHOD THEREOF

(71) Applicant: SANYO DENKI CO., LTD., Tokyo (JP)

(72) Inventors: Mitsuaki Shioiri, Tokyo (JP); Kouji Nakatake, Tokyo (JP); Yasushi Yoda, Tokyo (JP); Zhang Hong, Tokyo (JP); Kazuhiro Yoda, Tokyo (JP); Syogo Yoda, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 295 days.

(21) Appl. No.: 16/185,571

(22) Filed: Nov. 9, 2018

(65) Prior Publication Data
US 2019/0157931 A1 May 23, 2019

(30) Foreign Application Priority Data
Nov. 21, 2017 (JP) .............................. JP2017-223888

(51) Int. Cl.
H02K 3/32 (2006.01)
H02K 15/10 (2006.01)
H02K 15/02 (2006.01)
H02K 1/14 (2006.01)
H02K 3/52 (2006.01)

(52) U.S. Cl.
CPC ........... *H02K 3/325* (2013.01); *H02K 15/022* (2013.01); *H02K 15/10* (2013.01); *H02K 1/146* (2013.01); *H02K 3/522* (2013.01)

(58) Field of Classification Search
CPC ....... H02K 3/325; H02K 15/022; H02K 15/10
See application file for complete search history.

(56) References Cited

U.S. PATENT DOCUMENTS 6,984,911 B2 * 1/2006 Horie .................... H02K 3/325
310/194
7,663,287 B2 * 2/2010 Haga ..................... H02K 3/522
310/260
(Continued)

FOREIGN PATENT DOCUMENTS

JP 2001218407 A2 8/2001

OTHER PUBLICATIONS

Machine Translation of JP 2001 218407A Feb. 12, 2020.*

*Primary Examiner* — Robert W Horn
(74) *Attorney, Agent, or Firm* — Rankin, Hill & Clark LLP

(57) ABSTRACT

A stator of a rotating armature is provided which has: a stator core comprising laminated electromagnetic steel plates, the stator core including a plurality of teeth and slots formed on an inner periphery thereof; a first insulator and a second insulator inserted in the stator core; and windings wound around the teeth, wherein the first insulator includes a first comb-like engagement portion placed in the slots, the second insulator includes a second comb-like engagement portion placed in the slots, the first comb-like engagement portion includes a first tapered shape formed on a first distal end portion thereof, the second comb-like engagement portion includes a second tapered shape and a third tapered shape formed each on either side of a second distal end portion thereof in a radial direction of the stator core, and the first end portion and second distal end portion overlap with each other in the radial direction.

7 Claims, 5 Drawing Sheets

(56) References Cited

U.S. PATENT DOCUMENTS

| | | | | |
|---|---|---|---|---|
| 8,035,268 B2* | 10/2011 | Okuyama | ............ | H02K 3/522 |
| | | | | 310/215 |
| 9,154,010 B2* | 10/2015 | Yokogawa | ............ | H02K 3/345 |
| 2008/0278024 A1* | 11/2008 | Matsubara | ............ | H02K 3/325 |
| | | | | 310/216.065 |
| 2019/0020251 A1* | 1/2019 | Hosoda | ............ | H02K 15/105 |
| 2019/0157931 A1* | 5/2019 | Shioiri | ............ | H02K 3/325 |
| 2019/0319500 A1* | 10/2019 | Shinohara | ............ | H02K 15/10 |

* cited by examiner

STATOR OF ROTATING ARMATURE AND ASSEMBLY METHOD THEREOF

CROSS-REFERENCE TO RELATED APPLICATION

This application claims priority from Japanese Patent Application No. 2017-223888 filed with the Japan Patent Office on Nov. 21, 2017, the entire content of which is hereby incorporated by reference.

BACKGROUND

1. Technical Field

The present disclosure relates to a stator of a rotating armature and an assembly method thereof.

2. Related Art

A stator of a rotating armature includes a stator core including laminated electromagnetic steel plates, insulators each inserted into the stator core from either side in an axial direction of the stator core and each fitted to the stator core, wound windings insulated by the insulators from the stator core, and a connector assembled to the insulator and having a pin for binding an end of the winding thereto. The insulator has a shape that comes into intimate contact with the stator core to increase as much space for winding the winding as possible.

JP-A-2001-218407 discloses a stator of a motor including an insulator capable of supporting various lamination thicknesses of a stator core. The motor stator (stator) disclosed in JP-A-2001-218407 has the following structure; in other words, the stator of the motor includes a pair of insulators each fitted to either end portion of the stator core (stator core) in axial direction and insulating the stator core, and stator windings wound around tooth portions insulated by the insulators. Each insulator has a plurality of comb-like engagement portions that enters slot portions of the stator core. When the insulators are fitted to the stator core, a distal end of the comb-like engagement portion of one of the insulators has been inserted in the comb-like engagement portion of the other insulator. In this manner, both the comb-like engagement portions overlap partially.

SUMMARY

A stator of a rotating armature according to an embodiment of the present disclosure includes a stator core comprising laminated electromagnetic steel plates, the stator core including a plurality of teeth and slots formed on an inner periphery thereof; a first insulator and a second insulator inserted in the stator core; and windings wound around the teeth, wherein the first insulator includes a first comb-like engagement portion placed in the slots, the second insulator includes a second comb-like engagement portion placed in the slots, the first comb-like engagement portion includes a first tapered shape formed on a first distal end portion thereof, the second comb-like engagement portion includes a second tapered shape and a third tapered shape formed each on either side of a second distal end portion thereof in a radial direction of the stator core, and the first end portion and second distal end portion overlap with each other in the radial direction.

DETAILED DESCRIPTION

Figure 1:
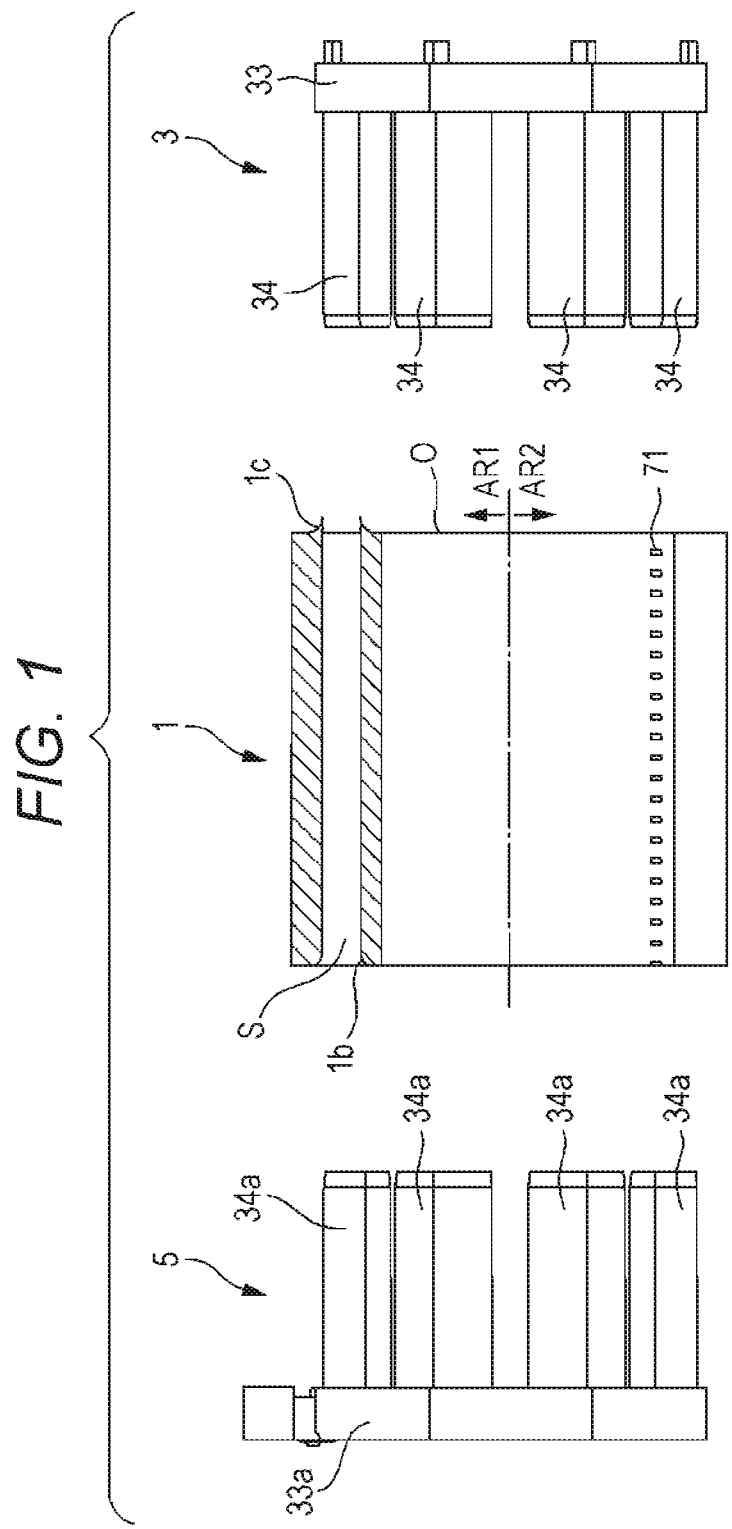
FIG. 1 is a schematic diagram illustrating a first insulator and a second insulator, each of which is inserted in a stator core from either end of the stator core, according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An insulator generally has a shape that comes into intimate contact with a stator core. Hence, it is necessary to accurately determine an insertion position and an insertion angle when inserting each insulator into the stator core from either end of the stator core. Hence, an insertion step is difficult.

Prior arts 1 and 2 aiming to increase the ease of insertion of the insulators into the stator core are known. However, these known technologies have the following problems.

1) Prior Art 1 (the Abutment Shape of a Distal End Portion)

According to this technology, a distal end of an insulator has a tapered shape to facilitate insertion. However, there are variations in the length of a stator core and the length of the insulator. Hence, distal ends of the insulators may interfere with each other. Alternately, there may be a gap between the distal ends of the insulators.

In the case of interference, the positions of the insulators with respect to the stator core are not determined. Hence, a binding pin may be displaced. Hence, a trouble may arise in an automatic binding connection step. If there is a gap between the distal ends of the insulators, there is a problem in a reduction in insulation performance.

2) Prior Art 2 (a Case of an Overlapping Shape as in JP-A-2001-218407)

A structure is known in which distal ends of insulators overlap each other to eliminate variations in the length of a stator core and the length of the insulator.

However, the distal end of the insulator that is inserted into a female side of the overlap needs to have a shape that comes into intimate contact with a slot portion of the stator core. Hence, the distal end does not have a tapered shape to facilitate insertion of the insulator.

Moreover, the stator core is a pressed laminate. Hence, its fracture surfaces include a "burr side" having burrs jutting up and a "sag side" having a smoothly drooping surface. When the insulator to be inserted into the sag side is inserted into the burr side, a distal end shape of the insulator hits burrs of the stator core. Hence, there is a problem that it becomes more difficult to insert the insulator.

Hence, an operator needs to perform the complicated work of visually determining the sag side of the stator core and manually inserting the insulator on the female side into the sag side.

An object of the present disclosure is to provide a stator of a rotating armature including an insulator also capable of supporting automatic insertion and easily inserted into a stator core.

According to an aspect of the present disclosure, a stator of a rotating armature is provided which includes: a stator core comprising laminated electromagnetic steel plates, the stator core including a plurality of teeth and slots formed on an inner periphery thereof; a first insulator and a second insulator inserted in the stator core; and windings wound around the teeth, wherein the first insulator includes a first comb-like engagement portion placed in the slots, the second insulator includes a second comb-like engagement portion placed in the slots, the first comb-like engagement portion includes a first tapered shape formed on a first distal end portion thereof, the second comb-like engagement portion includes a second tapered shape and a third tapered shape formed each on either side of a second distal end portion thereof in a radial direction of the stator core, and the first end portion and second distal end portion overlap with each other in the radial direction. A structure is realized in which there is no gap in the radial direction of the central axis of the stator core between the first and second distal end portions.

The stator core has a burr shape on one end side, and a sag shape on the other end side. It is preferable that the first comb-like engagement portion have the first distal end portion in such a manner as to be located opposite the one end side. Moreover, it is preferable that the second comb-like engagement portion have the second distal end portion in such a manner as to be located opposite the other end side.

When the stator core is formed by press lamination, a punching process with a die is performed. Hence, a sag side where a corner is rounded and a burr side where a corner is pointed are formed on end portions of the stator core. According to the above configuration, a gap is not created between the distal ends of both the insulators. Hence, a reduction in insulation properties hardly occurs.

Moreover, it is preferable that the second tapered shape be formed in such a manner that the second distal end portion is located at a position facing the first distal end portion having the first tapered shape. In addition, it is preferable that the third tapered shape be formed on the second distal end portion in such a manner as to be located opposite the second tapered shape and have a smaller inclination angle than the second tapered shaped.

The third tapered shape is formed to a degree that is easy to be inserted in accordance with the sag shape on the other end side. Consequently, it makes it easy to insert the insulators to a degree that can also support automatic insertion.

It is preferable that an index capable of distinguishing at least one of the burr (one end) side and the sag (the other end) side be formed on the stator core.

Consequently, it is possible to insert the second insulator into the other end side having the sag shape of the stator core without fail when inserting the insulator.

Moreover, the present disclosure provides a method for manufacturing the stator of the rotating armature described above. This method is a method for assembling the stator of the rotating armature including the step of inserting the first insulator into the one end side and the second insulator into the other end side, using the index of the stator core as a guide.

According to the present disclosure, it is possible to provide a stator of a rotating armature where insulators can be easily inserted into a stator core.

In the present specification, the terms, the burr side and the sag side of the stator core, are used with the following meanings:

In the step of forming the stator core, the stator core is formed by press lamination (FIG. 2: 1a) in some cases. At this point in time, a punching process is performed on a pressed laminate with a die. Hence, the sag side where a corner portion is rounded and the burr side where a corner portion is pointed are formed on end portions of the stator core.

A stator of a rotating armature and an assembly method thereof according to one embodiment of the present disclosure are described in detail hereinafter with reference to the drawings.

First Embodiment

Firstly, a first embodiment of the present disclosure is described.

Figure 2:
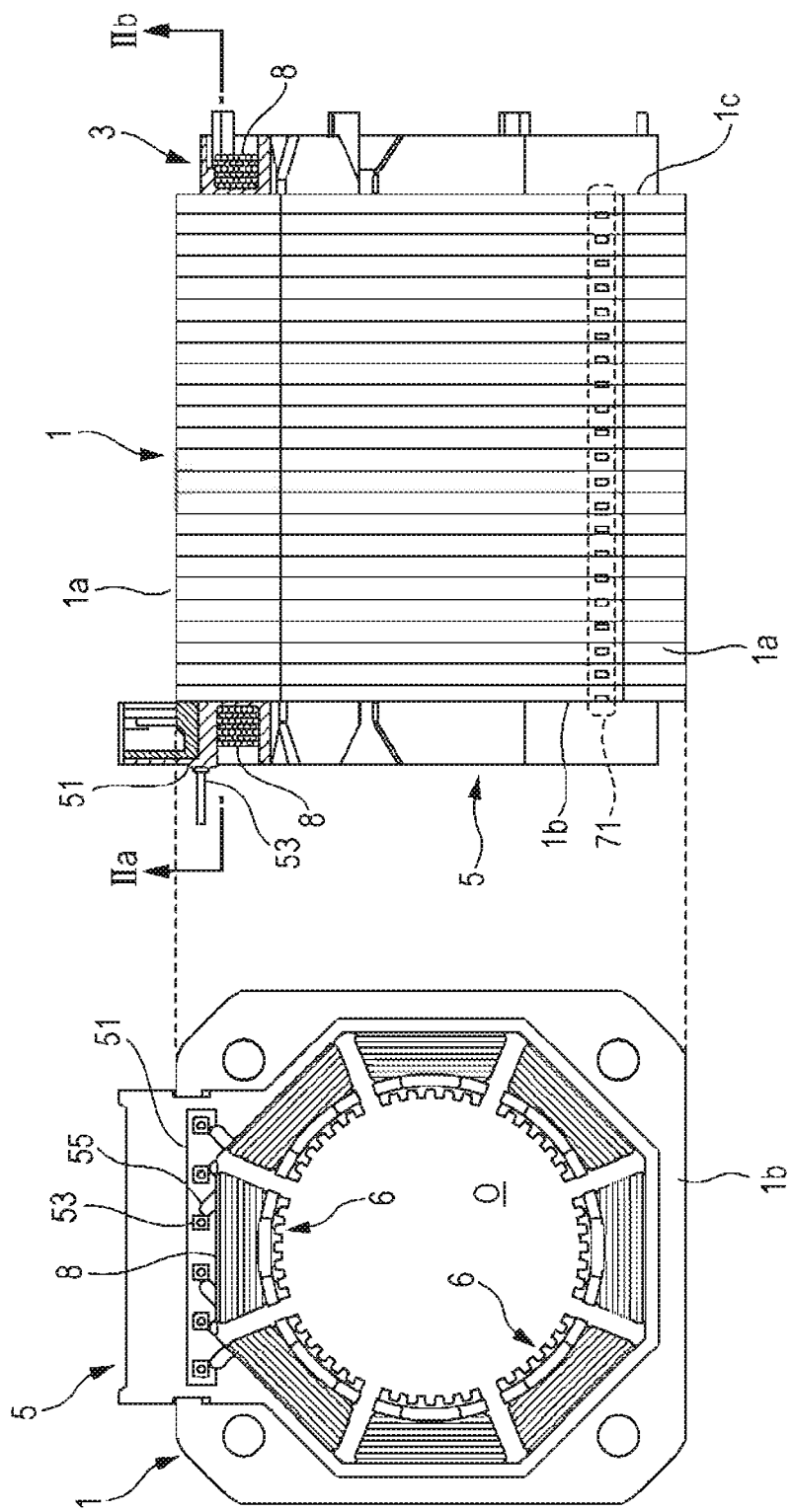
FIG. 2 is a front view (left view) and a side view (right view) of a stator of a rotating armature after the insulators are inserted.
Figure 3:
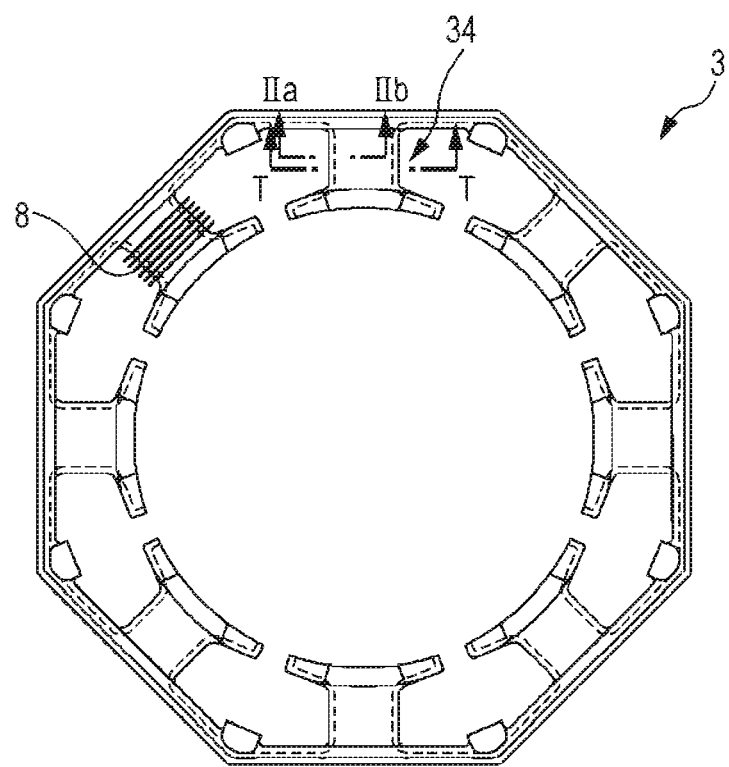
FIG. 3 is a diagram of the first insulator to be inserted into the stator core from an end portion on a burr side of the stator core when viewed from the front.
Figure 4:
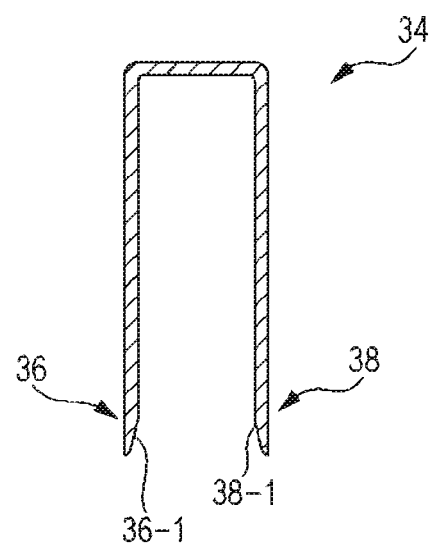
FIG. 4 is a cross-sectional view taken along line T-T of FIG. 3.
Figure 5:
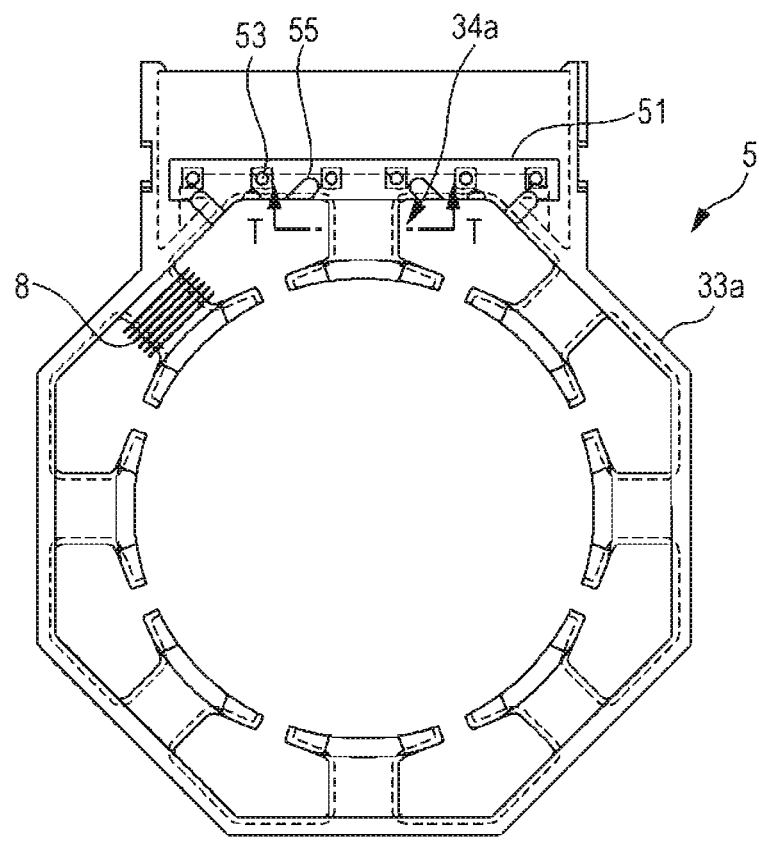
FIG. 5 is a diagram when viewed from the front of the second insulator to be inserted into the stator core from an end portion on a sag side of the stator core.
Figure 6:
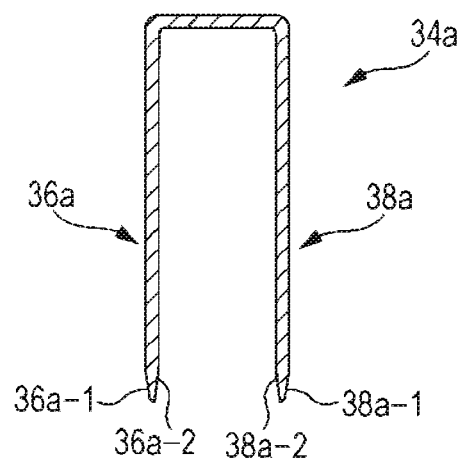
FIG. 6 is a cross-sectional view taken along line T-T of FIG. 5.
Figure 7:
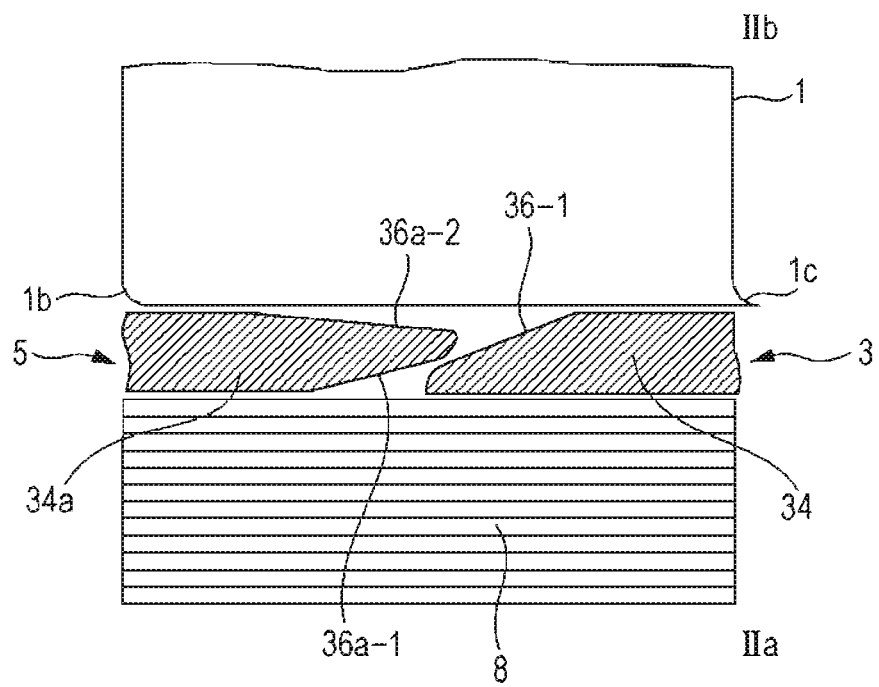
FIG. 7 is a cross-sectional view taken along line IIa-IIb of FIG. 2.

FIG. 1 is a schematic diagram illustrating a first insulator 3 and a second insulator 5, each of which is inserted in a stator core from either end of the stator core. In FIG. 1, an AR1 side is a cross-sectional view, and an AR2 side is a side view. FIG. 2 is a front view (left view) and a side view (right view) of a stator of a rotating armature after the insulators are inserted. FIG. 3 is a diagram of the first insulator 3 to be inserted into the stator core from an end portion on the burr side of the stator core when viewed from the front. FIG. 4 is a cross-sectional view taken along line T-T of FIG. 3. In FIG. 4, an up-and-down direction corresponds to a direction of the axis of rotation of a motor. FIG. 5 is a front view of the second insulator 5 to be inserted into the stator core from an end portion on the sag side of the stator core. FIG. 6 is a cross-sectional view taken along line T-T of FIG. 5. In FIG. 6, an up-and-down direction corresponds to a direction in which the axis of rotation of the motor extends. FIG. 7 is a cross-sectional view taken along line IIa-IIb of FIG. 2, and a plan view of a winding binding portion including a pin.

Figure 8:
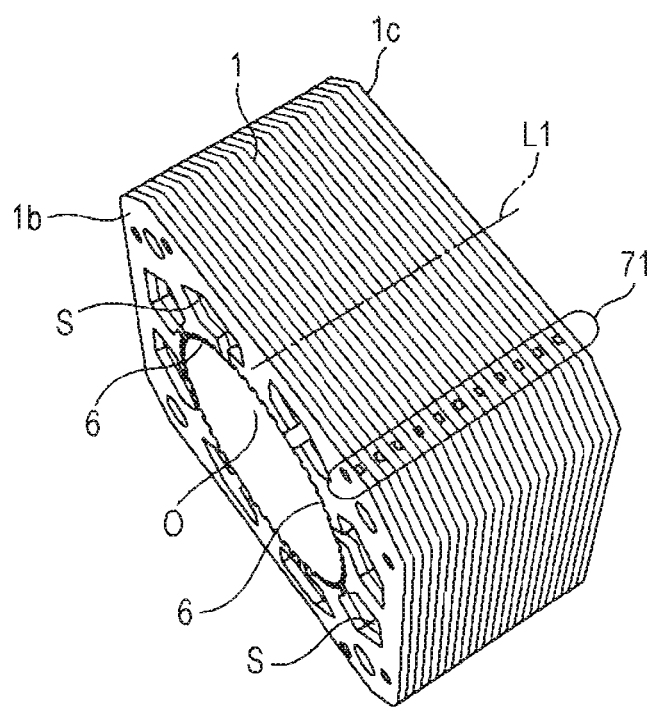
FIG. 8 is a schematic diagram of a stator core in a second embodiment of the present disclosure.

The stator of the rotating armature is assembled as illustrated in FIG. 1. FIG. 8 is also referred to as appropriate.

Firstly, press lamination is performed to form a stator core 1 having a sag side 1b and a burr side 1c, each of which is formed on either end portion.

As illustrated in FIGS. 1 and 2, an opening O is formed in a center portion of the stator core 1. An unillustrated rotor is placed in the opening. A plurality of teeth 6 is formed on an outer peripheral side of the opening O that is on an inner peripheral side of a stator outer side surface. A plurality of slots S opened inward and vertically is provided between a plurality of teeth 6 (FIG. 8).

A winding 8 is wound around the tooth 6 via the first insulator 3 and the second insulator 5, using the opening O and a space in the slot S. Consequently, a magnetic field of the stator 1 is formed by a concentrated series winding method. Consequently, the stator 1 is configured.

As illustrated in FIG. 1, the first insulator 3 is inserted from the burr side 1c of the stator core 1. The second insulator 5 is then inserted into the stator core from an end portion on the sag side 1b of the stator core 1.

The first insulator 3 is configured in such a manner as to be easily inserted into the stator core from an end portion on the burr side 1c of the stator core 1 illustrated in FIGS. 1 and 2. The second insulator 5 is configured in such a manner as to be easily inserted into the stator core from the end portion on the sag side 1b of the stator core 1 illustrated in FIGS. 1 and 2.

The first insulator 3 and the second insulator 5 include insulators with a comb-like cross-section (comb-like engagement portions 34 and 34a) that cover the plurality of teeth 6 formed on the stator core 1. The winding 8 is wound on an outer side of the insulator with the comb-like cross-section, using the slot S. Consequently, the winding 8 and the stator core 1 can be insulated. In other words, the comb-like engagement portions 34 and 34a are placed in the slots S.

At this point in time, while, for example, an end of the winding 8 is bound to a pin 53 of a binding portion 51 provided to either one of the first insulator 3 and the second insulator 5 (here, the second insulator 5) (55), the winding 8 is wound. Consequently, a winding portion can be easily and reliably formed. In the drawings, the winding 8 is wound around only one of the plurality of comb-like engagement portions 34 and 34a. However, the winding 8 is actually wound around each of the comb-like engagement portions 34 and 34a.

Next, the configurations of the first insulator 3 and the second insulator 5 are described in detail.

As illustrated in FIG. 4, the comb-like engagement portion 34 of the first insulator 3 has, for example, an angular U-shape in cross section. The comb-like engagement portion 34 has, on its distal end portions 36 and 38, tapered shapes 36-1 and 38-1 with an inclination that tapers toward a distal end on its inner side.

As illustrated in FIGS. 5 and 6, the comb-like engagement portion 34a of the second insulator 5 also has, for example, an angular U-shape in cross section. The comb-like engagement portion 34a has, on distal end portions 36a and 38a, inner tapered shapes 36a-2 and 38a-2 and outer tapered shapes 36a-1 and 38a-1 with inclinations that taper toward a distal end on its inner and outer sides.

FIG. 7 is a diagram illustrating an example of a cross-sectional configuration near the distal ends of the first and second insulators. In this drawing, the comb-like engagement portion 34 of the first insulator 3 is inserted in the stator core 1 from the end portion on the burr side 1c. Moreover, the comb-like engagement portion 34a of the second insulator 5 is inserted in the stator core 1 from the end portion on the sag side 1b.

As illustrated in FIG. 7, a first distal end portion of the comb-like engagement portion 34 of the first insulator 3 has the tapered shape 36-1 only on one side (stator core side). On the other hand, a second distal end portion of the comb-like engagement portion 34a of the second insulator 5 has the outer tapered shape 36a-1 in such a manner as to be in the vicinity of the first distal end portion having the tapered shape 36-1. In other words, a structure is realized in which a gap is not created between the first and second distal end portions in the radial direction of the central axis.

Furthermore, the second distal end portion of the comb-like engagement portion 34a of the second insulator 5 has the inner tapered shape 36a-2 on the stator core side. Hence, the distal end portion of the comb-like engagement portion 34a is guided more inward of the outline shape of the slot S than a case without the inner tapered shape 36a-2 on the stator core side. Hence, an advantage that an insertion is easily made from the sag side 1b can be obtained.

Also on the burr side 1c, the tapered shape 36-1 guides the distal end portion of the comb-like engagement portion 34 more inward of the outline shape of the slot S. Hence, it is easy to insert the distal end portion of the comb-like engagement portion 34. As the degree of taper is increased, it becomes easier to insert the distal end portion of the comb-like engagement portion. However, the degree of taper of the tapered shape 36-1 may be greater than the degree of taper of the inner tapered shape 36a-2 of the insulator 5 to be inserted from the end portion on the sag side 1b. Consequently, the difficulty of inserting the insulator 3 due to burrs on the burr side 1c is compensated.

In other words, according to the embodiment, the first and second distal end portions of the insulators have shapes that do not shoulder each other, in other words, one does not support the other. Hence, the binding position of the winding is stabilized. Moreover, a gap is not formed between the distal end portions. Hence, it is possible to maintain the insulation performance of the insulator between the stator core and the winding. Furthermore, the second insulator 5 to be inserted from the end portion on the sag side 1b has the inner tapered shape 36a-2 with a small inclination angle, on the stator core side of the second insulator 5. Consequently, it is easy to insert the second insulator 5 from the end portion on the sag side 1b. In other words, the large margin facilitates automatization (mechanization) of the insertion step.

As described above, according to the embodiment, the insulation performance of the insulator can be fully ensured.

The binding pin of the connector assembled to the insulator is hardly displaced. Hence, the binding position is stabilized.

Therefore, the insulator insertion step and the step of winding around the binding pin of the connector can be automatized. Hence, the number of man-hours can be reduced.

Second Embodiment

Next, a second embodiment of the present disclosure is described.

FIG. 8 is a schematic diagram of a stator core 1 according to the embodiment. FIG. 8 corresponds to FIG. 1. FIG. 8 is a diagram illustrating a method for improving the ease and reliability of insertion of the stator core in a case where the step of inserting the insulator is automatized.

As described above, the first insulator 3 is inserted from the end portion on the burr side 1c of the stator core 1. The second insulator 5 is then inserted from the end portion on the sag side 1b of the stator core 1. As a result, the structure illustrated in FIG. 7 is realized. Hence, effects such as an improvement in the insulation properties between the stator core 1 and the winding 8 can be obtained.

If the first insulator 3 and the second insulator 5 are inserted the other way around, there is a problem that not only is it difficult to insert the second insulator 5 but the insulation properties are not improved. Hence, in a case such as the automatization of the step of inserting the insulator, for example, a distinguishing mark with which it is possible to distinguish between the end portions on the sag side 1b and on the burr side 1c of the stator core 1 may be provided to reliably insert the second insulator 5 from not the burr side 1c but the sag side 1b of the stator core 1.

For example, as illustrated in FIG. 8, an index 71 is provided on a side surface of the stator core 1 at a position deviating outward of a center line L1 on the side surface. For example, an image recognition process is performed on an image captured with a camera or the like on the basis of the positional relationship between the index 71 and the center line L1; accordingly, the sag side 1b of the stator core 1 can be determined automatically. It is possible to distinguish between the sag side 1b and the burr side 1c of the stator core 1 on the basis of, for example, the presence or absence of the index 71 as a marker with respect to the center line L1 on the side surface of the stator core.

If it is possible to automatically distinguish between the sag side 1b and the burr side 1c of the stator core 1 in this manner, the first insulator 3 and the second insulator 5 can automatically and appropriately be inserted into the stator core 1.

For example, the shape and position of the index 71 is not limited to the shape and position illustrated in FIG. 8. The shape and position can be changed as appropriate, according to, for example, the configuration of an apparatus and the shape of the stator core.

For example, the illustrated configurations in the above embodiments are not limited to these illustrated configurations and can be changed as appropriate within the scope that exerts the effects of the present disclosure. In addition, the above embodiments can be modified as appropriate and carried out without departing from the scope of the object of the present disclosure.

Moreover, the components of the present disclosure can be freely selected. A rotating armature stator including the selected configurations is also included in the technical scope of the present disclosure.

The present disclosure can be used for a rotating armature stator.

The rotating armature stator of the present disclosure may be the following first to fourth rotating armature stators.

The first rotating armature stator is a stator of a rotating armature including: a stator core having laminated electromagnetic steel plates, the stator core having a plurality of teeth and slots formed on an inner periphery of the stator core; a first insulator and a second insulator configured to insulate the stator core; windings wound around the teeth insulated by the first and second insulators, and is characterized in that the first and second insulators have a first and a second comb-like engagement portion placed respectively in the slots, a first distal end portion of the first comb-like engagement portion is provided with a first tapered shape, a second distal end portion of the second comb-like engagement portion is provided with a second and a third tapered shape, one on either side in a radial direction, and the first and second distal end portions overlap in the radial direction.

The second rotating armature stator is the first stator of the rotating armature characterized in that the stator core has a burr shape on one end side and a sag shape on the other end side, the first comb-like engagement portion has the first distal end portion opposite the one end side, and the second comb-like engagement portion has the second distal end portion opposite the other end side.

The third rotating armature stator is the second stator of the rotating armature characterized in that the second tapered shape is formed at a position facing the first tapered shape, and the third tapered shape is provided, opposite the second tapered shape, with a smaller inclination angle than the second tapered shape.

The fourth rotating armature stator is the second or third stator of the rotating armature characterized in that an index capable of distinguishing at least the one end side or the other end side is formed on the stator core.

The method for assembling a stator of a rotating armature of the present disclosure is a method for manufacturing the fourth stator of the rotating armature, and may be characterized by including the step of inserting the first insulator into the one end side and the second insulator into the other end side, using the index of the stator core as a guide.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A stator of a rotating armature comprising:
   a stator core comprising laminated electromagnetic steel plates, the stator core including a plurality of teeth and slots formed on an inner periphery thereof;
   a first insulator and a second insulator inserted in the stator core; and
   windings wound around the teeth, wherein
   the first insulator includes a first comb-like engagement portion placed in the slots,
   the second insulator includes a second comb-like engagement portion placed in the slots,
   the first comb-like engagement portion includes a first tapered shape formed on a first distal end portion thereof,
   the second comb-like engagement portion includes a second tapered shape and a third tapered shape formed each on either side of a second distal end portion thereof in a radial direction of the stator core, and
   the first end portion and second distal end portion overlap with each other in the radial direction.

2. The stator of the rotating armature according to claim 1, wherein
   the stator core has a burr shape on one end side and a sag shape on other end side,
   the first comb-like engagement portion includes the first distal end portion in such a manner as to be located opposite the one end side, and
   the second comb-like engagement portion includes the second distal end portion in such a manner as to be located opposite the other end side.

3. The stator of the rotating armature according to claim 2, wherein
   the second tapered shape is formed in such a manner that the second distal end portion is located at a position facing the first distal end portion having the first tapered shape, and
   the third tapered shape is formed on the second distal end portion in such a manner as to be located opposite the second tapered shape and has a smaller inclination angle than the second tapered shape.

4. The stator of the rotating armature according to claim 2, wherein
   the stator core has an index formed thereon to allow at least the one end side or the other end side to be distinguished.

5. The stator of the rotating armature according to claim 3, wherein
   the stator core has an index formed thereon to allow at least the one end side or the other end side to be distinguished.

6. A method for assembling the stator of the rotating armature according to claim 4, comprising inserting the first insulator into the stator core from the one end side and the second insulator into the stator core from the other end side, using the index of the stator core as a guide.

7. A method for assembling the stator of the rotating armature according to claim 5, comprising inserting the first insulator into the stator core from the one end side and the second insulator into the stator core from the other end side, using the index of the stator core as a guide.

\* \* \* \* \*